United States Patent
Porter et al.

(10) Patent No.: US 9,822,667 B2
(45) Date of Patent: Nov. 21, 2017

(54) TRI-TAB LOCK WASHER

(71) Applicant: United Technologies Corporation, Hartford, CT (US)

(72) Inventors: Steven D. Porter, Wethersfield, CT (US); Anthony P. Cherolis, Hartford, CT (US); Alberto A. Mateo, Vernon, CT (US); Joshua Daniel Winn, Ellington, CT (US); Seth A. Max, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 290 days.

(21) Appl. No.: 14/679,305

(22) Filed: Apr. 6, 2015

(65) Prior Publication Data
US 2016/0290167 A1    Oct. 6, 2016

(51) Int. Cl.
| F01D 25/00 | (2006.01) |
|---|---|
| F01D 25/24 | (2006.01) |
| F16B 43/00 | (2006.01) |
| F01D 9/06 | (2006.01) |
| F01D 25/16 | (2006.01) |
| F16B 39/10 | (2006.01) |
| F01D 9/02 | (2006.01) |
| F01D 9/00 | (2006.01) |
| F16B 39/24 | (2006.01) |

(52) U.S. Cl.
CPC ............ *F01D 25/243* (2013.01); *F01D 9/065* (2013.01); *F01D 25/162* (2013.01); *F16B 43/00* (2013.01); *F01D 9/00* (2013.01); *F01D 9/02* (2013.01); *F01D 25/00* (2013.01); *F01D 25/246* (2013.01); *F16B 39/101* (2013.01); *F16B 39/108* (2013.01); *F16B 39/24* (2013.01)

(58) Field of Classification Search
CPC ........ F16B 43/00; F16B 39/00; F16B 39/108; F16B 39/101; F16B 39/24; F01D 25/243; F01D 25/246; F01D 25/162; F01D 25/125; F01D 25/00; F01D 9/00; F01D 9/02; F05D 2260/31
USPC .......................................... 411/102, 122, 123
See application file for complete search history.

(56) References Cited

U.S. PATENT DOCUMENTS

| 2,423,918 | A |   | 7/1947 | Wohlhieter |
|---|---|---|---|---|
| 3,489,196 | A |   | 1/1970 | Stock |
| 3,713,686 | A |   | 1/1973 | Eddy et al. |
| 4,808,069 | A |   | 2/1989 | Bonner et al. |
| 5,292,227 | A |   | 3/1994 | Czachor et al. |
| 5,755,824 | A | * | 5/1998 | Blechschmidt ....... F16B 33/008 |
|   |   |   |   | 470/163 |

(Continued)

FOREIGN PATENT DOCUMENTS

WO    2014105716 A1    7/2014

OTHER PUBLICATIONS

Extended European Search Report for EP Application No. 16163980.2, dated Oct. 6, 2016, 9 pages.

*Primary Examiner* — Woody Lee, Jr.
*Assistant Examiner* — Behnoush Haghighian
(74) *Attorney, Agent, or Firm* — Kinney & Lange, P.A.

(57) ABSTRACT

A washer includes a hub and a first lobe connected to the hub. The first lobe includes a first hole. A second lobe is also connected to the hub and includes a second hole. A third lobe is also connected to the hub and includes a third hole. The first lobe extends from the hub at least partially in a first direction opposite the second lobe and the third lobe.

16 Claims, 7 Drawing Sheets

(56) References Cited

U.S. PATENT DOCUMENTS

| | | |
|---|---|---|
| 6,439,616 B1 | 8/2002 | Karafillis et al. |
| 6,439,841 B1 | 8/2002 | Bosel |
| 6,669,393 B2 | 12/2003 | Schilling |
| 6,884,024 B2 | 4/2005 | Boeck et al. |
| 7,708,509 B1 * | 5/2010 | Bennett ................ F16B 39/108 411/119 |
| 8,061,969 B2 | 11/2011 | Durocher et al. |
| 8,091,371 B2 | 1/2012 | Durocher et al. |
| 8,099,962 B2 | 1/2012 | Durocher et al. |
| 8,245,518 B2 | 8/2012 | Durocher et al. |
| 8,347,500 B2 | 1/2013 | Durocher et al. |
| 8,347,635 B2 | 1/2013 | Durocher et al. |
| 8,579,583 B2 | 11/2013 | Bock |
| 8,668,457 B2 | 3/2014 | Juh |
| 8,800,298 B2 | 8/2014 | Ladd et al. |
| 2014/0013770 A1 * | 1/2014 | Farah ..................... F01D 25/16 60/796 |
| 2014/0037399 A1 | 2/2014 | Hyatt |

* cited by examiner

TRI-TAB LOCK WASHER

BACKGROUND

The application relates generally to gas turbine engines, and more particularly, to engine case structures, such as mid turbine frame assemblies and similar structures.

A mid turbine frame (MTF) assembly, sometimes referred to as an interturbine frame, is located generally between a high turbine stage and a low pressure turbine stage of a gas turbine engine to support one or more bearings and to transfer bearing loads through to an outer engine case. The MTF assembly typically includes an inner case disposed around a rotor shaft of the gas turbine engine and the bearings supporting the rotor shaft. An outer case is disposed around the inner case to form a flowpath between the inner case and the outer case. Struts extend across the flowpath to connect the inner case to the outer case and to form a load path between the inner case and the outer case. The MTF assembly is thus a load bearing structure, and the safety of load transfer is one concern when a MTF assembly is designed.

In the past, some MTF assemblies have been formed by integrally forming the struts and inner case through a common casting and bolting the outer casing to the struts. In other previous MTF assembly designs, the struts have been mechanically connected to both the inner case and the outer case. In the MTF assembly designs where the struts are mechanically connected to both the inner case and the outer case, slots and grooves have been formed in both the outer case and the inner case to help prevent the struts and the mechanical connections of the struts from moving and coming loose. However, forming grooves and slots in the inner case and the outer case can create stress risers in the inner case and the outer case that can reduce the service life the MTF assembly. Accordingly, there is a need to provide improvements over previous MTF assemblies.

SUMMARY

In one aspect of the invention, a washer includes a hub and a first lobe connected to the hub. The first lobe includes a first hole. A second lobe is also connected to the hub and includes a second hole. A third lobe is also connected to the hub and includes a third hole. The first lobe extends from the hub at least partially in a first direction opposite the second lobe and the third lobe.

In another aspect of the invention, a mid turbine frame includes an outer case, an inner case disposed radially within the outer case, and a strut extending radially between the outer case and the inner case. The strut includes a first end connected to the outer case, a second end forming a foot disposed against an outer surface of the inner case, and a cooling air passage formed inside the strut and that extends from the first end of the strut to the second end of the strut. The mid turbine frame also includes a washer disposed on an inner surface of the inner case opposite the foot of the strut. The washer includes a hub, a first lobe connected to the hub and having a first hole, a second lobe connected to the hub and having a second hole; and a third lobe connected to the hub and having a third hole. The first lobe extends from the hub at least partially in a first direction opposite the second lobe and the third lobe.

In another aspect of the invention, a generally triangular washer includes a first corner having a first hole, a second corner having a second hole, and a third corner having a third hole. The washer also includes a generally triangular cutout formed between the first corner and the second corner, and a generally rectangular cutout formed between the second corner and the third corner. A first tab extends from the first corner of the washer into the generally triangular cutout. A second tab extends from the second corner of the washer into the generally rectangular cutout. A third tab extends from the third corner of the washer into the generally rectangular cutout.

Persons of ordinary skill in the art will recognize that other aspects and embodiments of the present invention are possible in view of the entirety of the present disclosure, including the accompanying figures.

Figure 1:
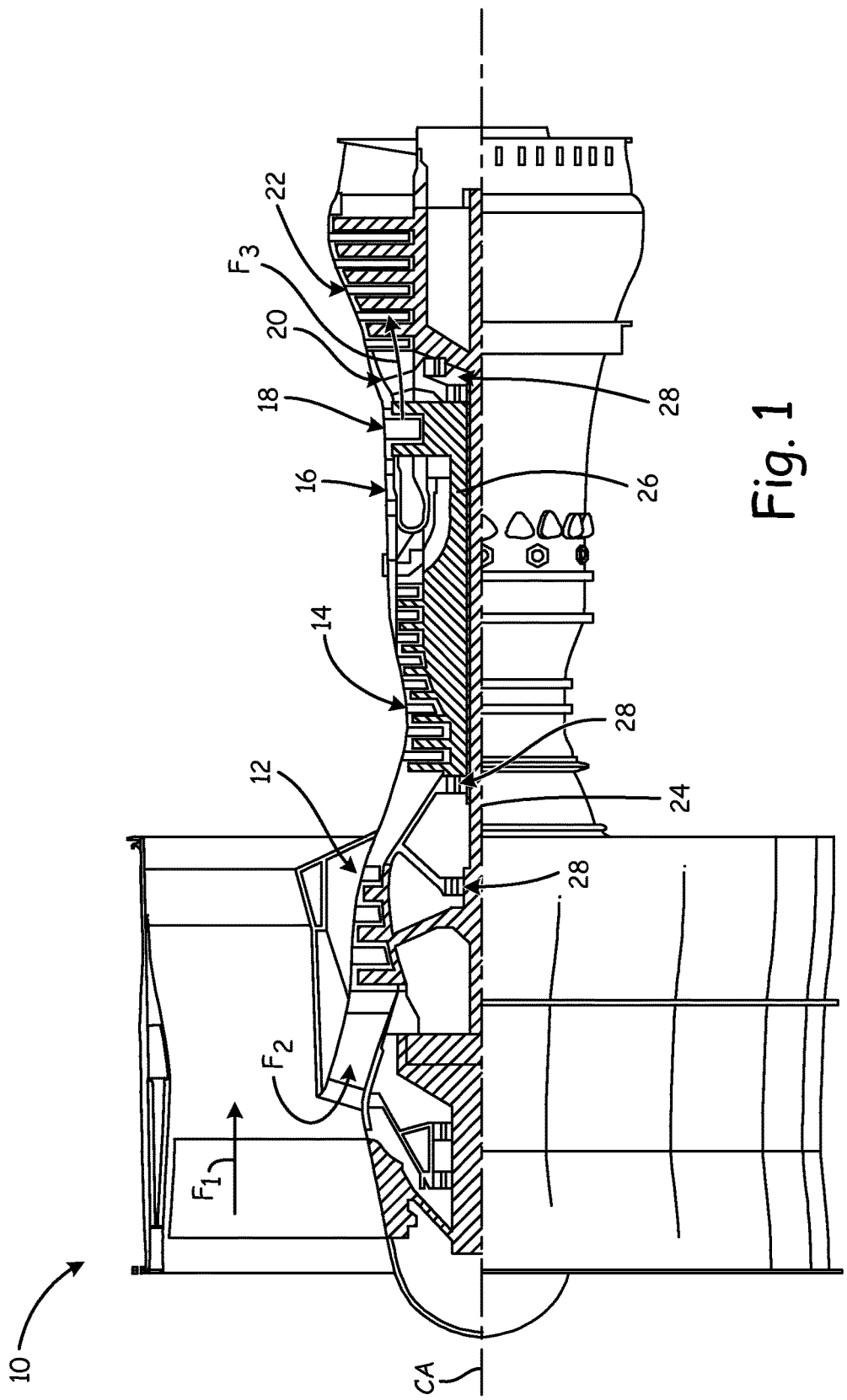
FIG. 1 is a partial sectional schematic view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a mid turbine case with an outer case, an inner case, and at least one strut connected between the inner case and the outer case. The strut includes a foot with three holes formed on an end that is connected to the inner case. Three corresponding holes are formed on the inner case and a single washer is disposed on an inner surface of the inner case opposite the foot. As described below with reference to the Figures, the washer also includes three holes and three sets of anti-rotation tabs that can be bent against heads of fasteners inserted into the three holes of the washer, case, and strut to help reduce the likelihood that the fasteners will rotate relative washer. Because the washer is connected to three fasteners, the three fasteners prevent the washer from rotating relative the inner case. The inner case, therefore, does not require any slots or grooves to be formed in the inner surface of the inner case to accommodate anti-rotation features used on prior art mid turbine frame assemblies. The three holes of the washer can also be misaligned from each other so as to only allow a single orientation in which the washer can be installed on the inner surface of the inner case. By only allowing a single orientation in which the washer can be installed, the washer is mistake-proofed against improper installation.

FIG. 1 is a partial sectional schematic view of gas turbine engine 10. In the illustrated embodiment, gas turbine engine 10 is a turbofan gas turbine engine circumferentially disposed about a central, longitudinal axis or axial engine centerline axis CA as illustrated in FIG. 1. Although the disclosed non-limiting embodiment of gas turbine engine 10 depicts a turbofan gas turbine engine, it should be understood that the concepts described herein are not limited to use with turbofans as the teachings may be applied to other types of turbine engines; for example an industrial power turbine. Gas turbine engine 10 includes in series order from front to rear, low pressure compressor section 12, high pressure compressor section 14, combustor section 16, high pressure turbine section 18, mid turbine frame 20, and low pressure turbine section 22. Gas turbine engine 10 also includes low pressure rotor shaft 24 and high pressure rotor shaft 26. Low pressure rotor shaft 24 rotationally connects low pressure turbine section 22 with low pressure compressor section 12, and high pressure rotor shaft 26 rotationally connects high pressure turbine section 18 with high pressure compressor section 14. As shown in FIG. 1, gas turbine engine 10 can also include bearing assemblies 28 to support low pressure rotor shaft 24 and high pressure rotor shaft 26.

As is well known in the art of gas turbines, incoming ambient air $F_1$ becomes pressurized air $F_2$ in the low and high pressure compressors 12 and 14. Fuel mixes with pressurized air $F_2$ in combustor section 16, where it is burned. Once burned, combustion gases $F_3$ expand through high and low pressure turbine sections 18 and 22 and mid turbine frame 20. High and low pressure turbine sections 18 and 22 drive high and low pressure rotor shafts 26 and 24 respectively, which rotate in response to the combustion products and thus rotate the attached high and low pressure compressor sections 14 and 12.

Mid turbine frame 20 is arranged generally between high pressure turbine section 18 and low pressure turbine section 22. Mid turbine frame 20 supports bearing systems 28 in high pressure turbine section 18 and low pressure turbine section 22 as well as conditioning the flow of combustion gases $F_3$ entering low pressure turbine section 22 from high pressure turbine section 18. Mid turbine frame 20 is discussed in greater detail below with reference to FIG. 2.

Figure 2:
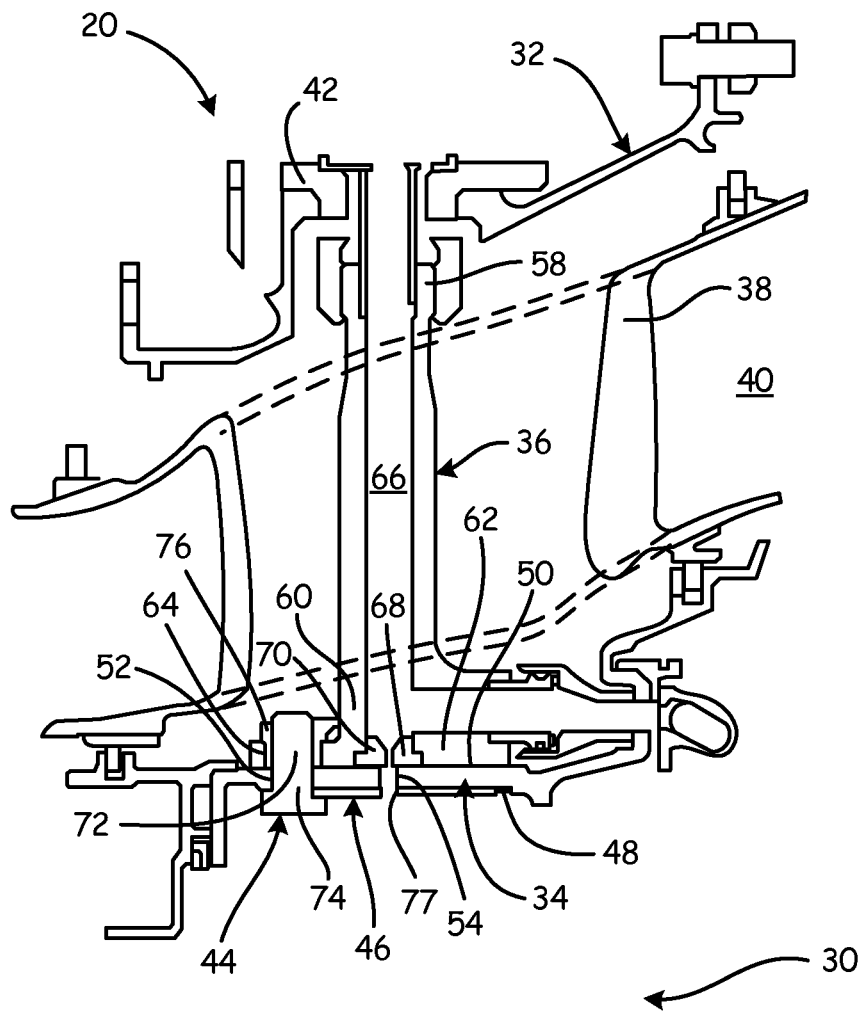
FIG. 2 is a sectional view of a mid turbine frame compatible with the gas turbine engine of FIG. 1.

FIG. 2 is a cross-sectional view of mid turbine frame 20 disposed around bearing compartment 30 that houses one of bearing assemblies 28. As shown in FIG. 2, mid turbine frame 20 can include annular outer case 32, annular inner case 34, struts 36 (only one of which is shown in FIG. 2), shroud 38, and flow passage 40. At each of struts 36, mid turbine frame 20 can also include outer fastener 42, three inner fasteners 44 (only one of which is shown in FIG. 2), and washer 46. Inner case 34 can include inner surface 48 and outer surface 50. At each of struts 36, inner case 34 can also include three case holes 52 (only one of which is shown in FIG. 2), and cooling air inlet 54 (only one which is shown in FIG. 2). Each of struts 36 can include first end 58, second end 60, foot 62 with three foot holes 64 (only one of which is shown in FIG. 2), cooling air passage 66, and plug 68 with plug cooling hole 70. Each of fasteners 44 can include bolt 72 with head 74, and nut 76. Washer 46 can include cooling air hole 77.

Annular inner case 34 is disposed radially within annular outer case 32. Struts 36 can extend radially between outer case 32 and inner case 34 and can radially space outer case 32 from inner case 34 so as to form annular flow passage 40 between inner case 34 and outer case 32. Only one of struts 36 is shown in FIG. 2, however, the description of strut 36 shown in FIG. 2 can be applied to all of struts 36 in mid turbine frame 20. First end 58 of strut 36 is connected to outer case 32 by outer fastener 42. Second end 60 of strut 36 is disposed both opposite first end 58 of strut 36 and proximate inner case 34. Second end 60 of strut 36 can form foot 62. Foot 62 can enlarge second end 60 of strut 36 in a forward-aft direction and in a circumferential direction so as to provide sufficient space on foot 62 to accommodate three radially oriented foot holes 64. Foot holes 64 are configured for attaching foot 62 and first end 58 of strut 36 to outer surface 50 of inner case 34. Foot 62 of strut 36 can be curved so as to conform to outer surface 50 of inner case 34, or a portion of outer surface 50 of inner case 34 can be flattened so as to allow foot 62 to abut flush with outer surface 50 of inner case 34.

The three case holes 52 (only one of which is shown in FIG. 2) extend from inner surface 48 of inner case 34 to outer surface 50 of inner case 34 and can be positioned on inner case 34 so as to meet up with the three foot holes 64 of strut 36. One of bolts 72 can be inserted into each of case holes 52 and foot holes 64 so that heads 74 of bolts 72 are disposed on inner surface 48 of inner case 34, and threaded ends of bolts 72 extend through inner case 34 and foot 62. Nuts 76 can be connected to the threaded ends of bolts 72 so as to connect foot 62 and second end 60 of strut 36 to outer surface 50 of inner case 34. Shroud 38 can be disposed in flow passage 40 and can at least partially cover strut 36, outer surface 50 of inner case 34, and an inner surface of outer case 32 so as to protect strut 36, inner case 34, and outer case 32 from the corrosive heat of combustion gases $F_3$ passing through flow passage 40.

Cooling air passage 66 can be formed inside strut 36 and can extend from first end 58 of strut 36 to second end 60 of strut 36 to allow cooling air to be directed from outer case 32, through strut 36, and towards inner case 34. At second end 60 of strut 36, cooling air passage 66 can branch such that a first portion of cooling air passage 66 moves aft through foot 62 toward low pressure turbine section 22 (shown in FIG. 1), and a second portion of cooling air passage 66 continues radially inward through foot 62. Cooling air inlet 54 can be a hole that extends from outer surface 50 of inner case 34 to inner surface 48 of inner case 34 and can be aligned with the second portion of cooling air passage 66 such that a portion of the cooling air traveling in cooling air passage 66 can enter bearing compartment 30 via cooling air inlet 54 to cool bearing assemblies 28. Plug 68 can be disposed in cooling air passage 66 proximate second end 60 of strut 36. Plug cooling hole 70 of plug 68 can be smaller in diameter than cooling air passage 66 of strut 36 so as to meter and control the amount of cooling air entering cooling air inlet 54 of inner case 34 and bearing compartment 30. Cooling air inlet 54 of inner case 34 can be larger in diameter than plug cooling hole 70 so as to ensure that inner case 34 does not obstruct plug cooling hole 70.

Washer 46 is disposed on inner surface 48 of inner case 34 opposite foot 62 of strut 36. Washer 46 is disposed between heads 74 of bolts 72 and inner surface 48 of inner case 34. Washer 46 can be formed from a nickel metal alloy, or any other metal that is resistant to corrosion in the high temperature environment of mid turbine frame 20. As shown in FIG. 2, cooling air hole 77 can extend through washer 46 and can be aligned with cooling air inlet 54 and plug cooling hole 70 so as to prevent washer 46 from obstructing cooling air inlet 54 and plug cooling hole 70. As discussed below with reference to FIGS. 3 and 4, washer 46 can be configured to provide anti-rotation of bolts 72 without compromising the structural integrity and service life of inner case 34.

Figure 3:
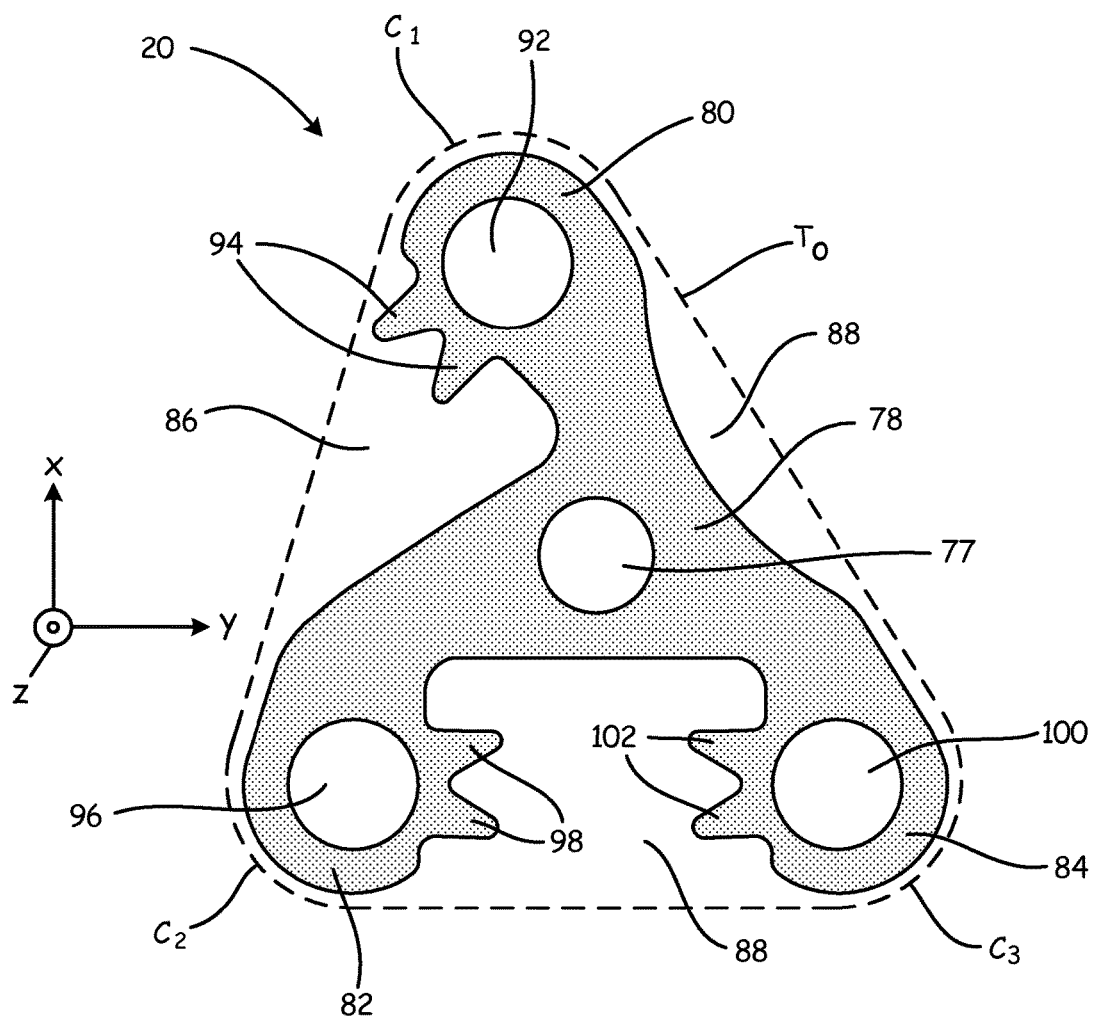
FIG. 3 is an elevation view of a washer from the mid turbine frame of FIG. 2.
Figure 4:
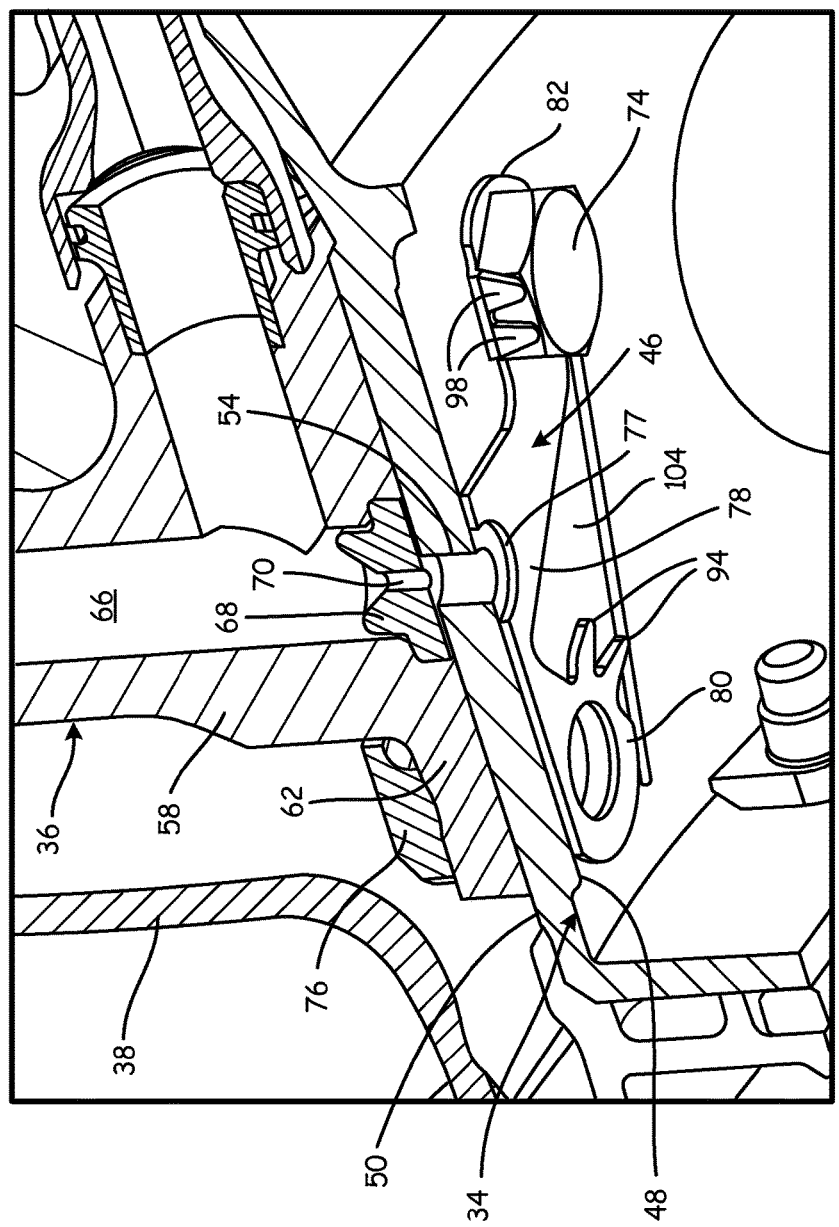
FIG. 4 is a perspective sectional view of the mid turbine frame of FIG. 2.
Figure 5:
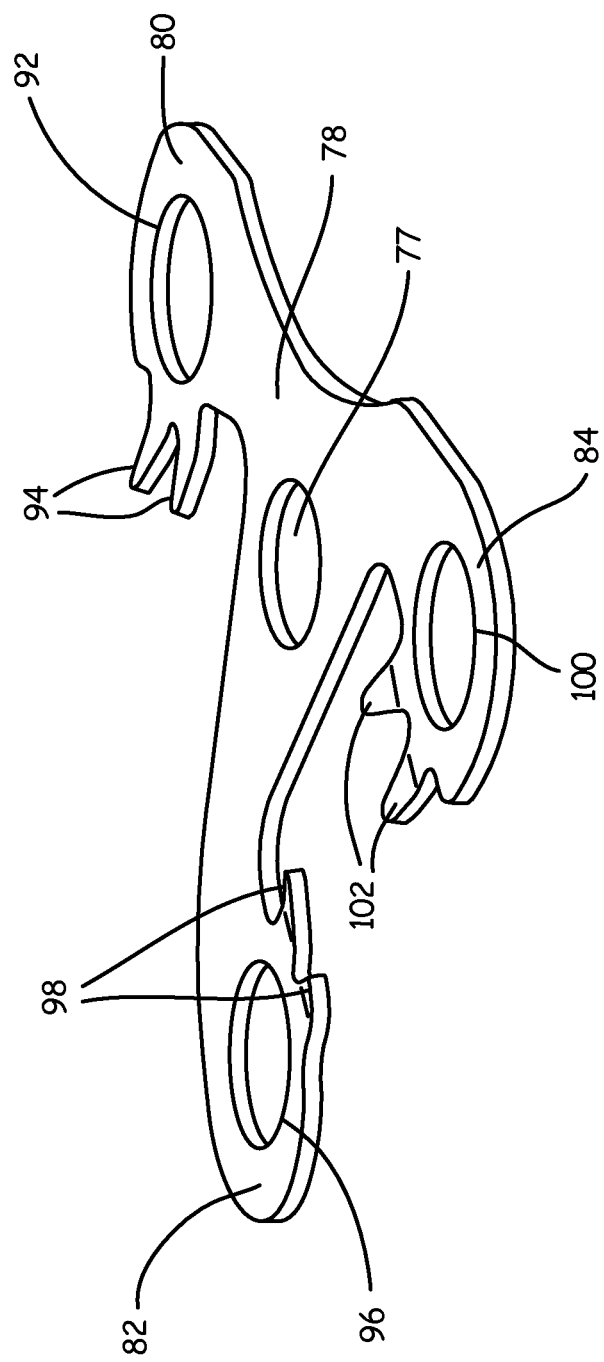
FIG. 5 is a perspective view of the washer of FIG. 3.

FIGS. 3-5 will be discussed concurrently. FIG. 3 is an elevation view of washer 46 from mid turbine frame 20 of FIG. 2, and FIG. 4 is a perspective sectional view of mid turbine frame 20 of FIG. 2 showing a portion of washer 46. FIG. 5 is a perspective view of washer 46 shown in FIGS. 3 and 4. As shown in FIGS. 3-5, washer 46 can include triangular outline $T_O$, hub 78, first lobe 80, second lobe 82, third lobe 84, generally triangular cutout 86, generally rectangular cutout 88, curved cutout 89, and cooling air hole 77. First lobe 80 of washer 46 can include first hole 92 and tabs 94. Second lobe 82 can include second hole 96 and tabs 98. Third lobe 84 can include third hole 100 and tabs 102. As shown in FIG. 4, inner case 34 can include platform 104.

Washer 46 can be generally triangular, as shown by triangular outline $T_O$ illustrated in phantom in FIG. 3. First lobe 80 can form first corner $C_1$ of triangular outline $T_O$, second lobe 82 can form second corner $C_2$ of triangular outline $T_O$, and third lobe 84 can form third corner $C_3$ of triangular outline $T_O$. Triangular outline $T_O$, hub 78, first lobe 80, second lobe 82, and third lobe 84 of washer 46 can all be coplanar on a plane established by a first direction, labeled as x-axis in FIG. 3, and a second direction, labeled as y-axis in FIG. 3. The x-axis is perpendicular to the y-axis. A third direction is shown in FIG. 3, labeled as z-axis, which is perpendicular to both the x-axis and the y-axis.

Generally triangular cutout 86 can be formed between first corner $C_1$ and second corner $C_2$ of triangular outline $T_O$ of washer 46. Curved cutout 89 can be formed between first corner $C_1$ and third corner $C_3$ of triangular outline $T_O$. Together, generally triangular cutout 86 and curved cutout 89 shape first lobe 80 out of first corner $C_1$ of triangular outline $T_O$. Generally rectangular cutout 88 can be formed between second corner $C_2$ and third corner $C_3$ of triangular outline $T_O$. Generally rectangular cutout 88 and generally triangular cutout 86 shape second lobe 82 out of second corner $C_2$ of triangular outline $T_O$. Curved cutout 89 and generally rectangular cutout 88 together shape third lobe 84 out of third corner $C_3$ of triangular outline $T_O$. Along with shaping first lobe 80, second lobe 82, and third lobe 84 out of triangular outline $T_O$, cutouts 86, 88, and 89 also form hub 78 of washer 46. Cutouts 86, 88, and 89 also serve washer 46 by reducing an overall weight of washer 46. Reducing the overall weight of washer 46 can also beneficially reduce the overall weight and fuel consumption of gas turbine engine 10.

First lobe 80, second lobe 82, and third lobe 84 are all connected to hub 78. First lobe 80 can extend from hub 78 at least partially in the direction of the x-axis opposite second lobe 82 and third lobe 84. Second lobe 82 and third lobe 84 can be spaced from one another in the direction of the y-axis. First hole 92 is formed in first lobe 80, second hole 96 can be formed in second lobe 82, and third hole 100 can be formed in third lobe 84. Cooling air hole 77 can be formed in hub 78 of washer 46 and disposed between first lobe 80 and generally rectangular cutout 88. Flat platform 104 can be formed on inner surface 48 of inner case 34 so as to provide a flat surface on inner case 34 so that cooling air hole 90 of washer 46 is flush against inner surface 48 of inner case 34.

In addition to shaping first lobe 80, second lobe 82, and third lobe 84 out of triangular outline $T_O$, cutouts 86, 88, and 89 also provide space within triangular outline $T_O$ for the formation of tabs 94 of first lobe 80, tabs 98 of second lobe 82, and tabs 102 of third lobe 84. Tabs 94 of first lobe 80, which can be two in number as shown in FIG. 3, can extend from first lobe 80 into generally triangular cutout 86 and toward second lobe 82. Tabs 98 of second lobe 82, which can also be two in number as shown in FIG. 3, can extend from second lobe 82 into the generally rectangular cutout 88 and toward third lobe 84. Tabs 102 of third lobe 84, which can also be two in number, can extend from third lobe 84 into the generally rectangular cutout 88 and toward second lobe 82. Tabs 94 of first lobe 80, tabs 98 of second lobe 82, and tabs 102 of third lobe 84 can all be configured to be bent toward the z-axis and against heads 74 of the respective bolts 72 disposed in first hole 92, second hole 96, and third hole 100 of washer 46. As shown in FIG. 5, Tabs 94, 98, and 102 can all be pre-bent relative lobes 80, 82, and 84 respectively so that tabs 94, 98, and 102 are at least partially elevated off of inner surface 48 of inner case 34 before tabs 94, 98, and 102 are bent against heads 74 of bolts 72. Partially elevating tabs 94, 98, and 102 off of inner surface 48 of inner case 34 allows an operator easier access to tabs 94, 98, and 102 to bend tabs 94, 98, and 102 against heads 74 of bolts 72, thereby reducing the likelihood that the operator will gouge or damage inner surface 48 of inner case 34 during assembly of mid turbine frame 20.

When mid turbine 20 is assembled properly, as shown in FIG. 4, first hole 92 of washer 46, second hole 96 of washer 46, and third hole 100 of washer 46 are all concentric with one of foot holes 64 and one of case holes 52 so as to receive one of bolts 72 respectively. As discussed above with reference to FIG. 2, cooling air hole 77 can be concentric with cooling air inlet 54 of inner case 34. As a failsafe, cooling air hole 77 can be larger in diameter than cooling air inlet 54 of inner case 34 so as to ensure that washer 46 does not block or restrict cooling air inlet 54 of inner case 34. After bolts 72 have been installed in first hole 92, second hole 96, and third hole 100 of washer 46 and foot 62 of strut 36 is connected to inner case 34, tabs 94, 98, and 102 of washer 46 can be bent away from inner case 34 and against heads 74 of bolts 72 to prevent bolts 72 from turning and loosening relative washer 46 during operation of gas turbine engine 10 (shown in FIG. 1). Because washer 46 is connected to more than one of bolts 72, washer 46 is also unable to turn or move relative inner case 34 and loosen bolts 72 during operation of gas turbine engine 10.

As shown in FIG. 3, triangular outline $T_O$ of washer 46 can be a scalene triangle. Because triangular outline $T_O$ can be a scalene triangle, second hole 96 of can be spaced closer to first hole 92 than third hole 100 can be spaced from first hole 92. First hole 92 of washer 46 can be nonaligned with cooling air hole 77 in the direction of the x-axis. Second hole 96 of washer 46 can be nonaligned with both cooling air hole 77 and first hole 92 of washer 46 in the direction of the x-axis. Second hole 96 of washer 46 can also be nonaligned with third hole 100 of washer 46 in the direction of the y-axis. As discussed below with reference to FIGS. 6C-7C, scalene triangular outline $T_O$ of washer 46 reduces the likelihood of an operator installing washer 46 into mid turbine frame 20 incorrectly because scalene triangular outline $T_O$ of washer 46 only allows a single orientation for installing washer 46.

FIGS. 6C-7C will be discussed concurrently. FIG. 6A is an elevation view of the washer 46 from FIGS. 3-5 orientated in a correct position for installation on inner surface 48 of inner case 34. Washer 46 shown in FIG. 6A is in a correct position on inner case 34 because each of holes 92, 96, and 100 of washer 46 are concentric with one of case holes 52. Washer 46 shown in FIG. 6A is also in a correct position because hub 78, first lobe 80, second lobe 82, and third lobe 84 of washer 46 are flush against inner surface 48 of inner case 34 while all of tabs 94, 98, and 102 of washer 46 are at least partially elevated off of inner surface 48 of inner case 34. FIGS. 6B-7C show that all orientations of washer 46 other than the orientation shown in FIG. 6A do not allow for installation of washer 46 on inner case 34, thereby inducing an operator to only install washer 46 in the orientation shown in FIG. 6A.

Figure 6A:
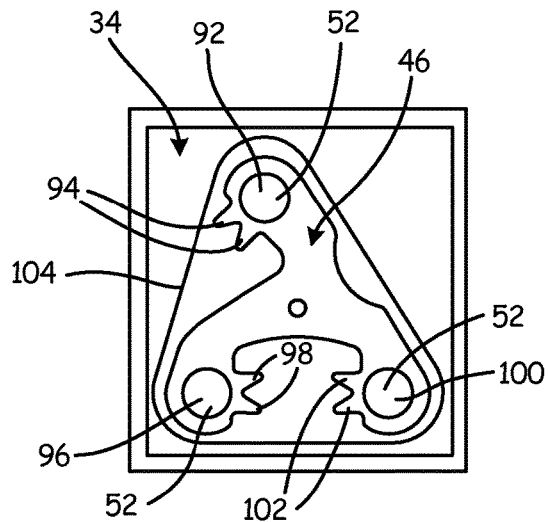
FIG. 6A is an elevation view of the washer from FIG. 5 orientated in a correct position for installation.
Figure 6B:
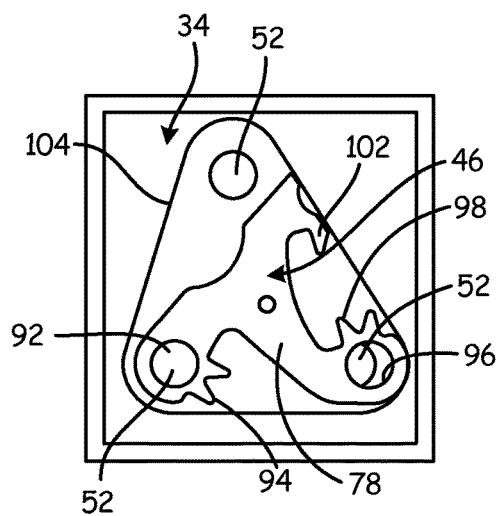
FIG. 6B is an elevation view of the washer from FIG. 5 orientated in an incorrect position for installation.
Figure 6C:
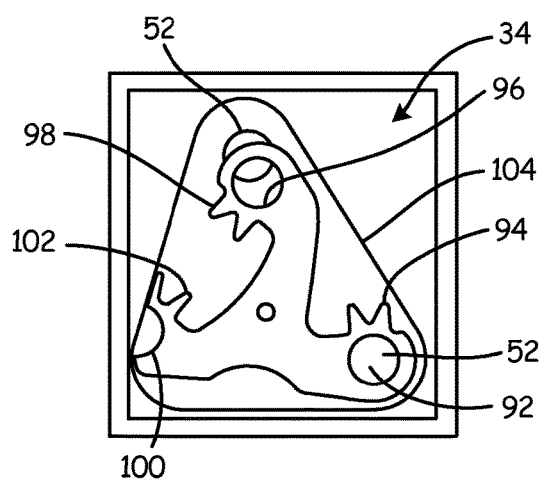
FIG. 6C is an elevation view of the washer from FIG. 5 orientated in another incorrect position for installation.

FIG. 6B is an elevation view of the washer 46 rotated to the counter-clockwise approximately 120 degrees from the correct orientation of FIG. 6A. Washer 46 cannot be installed on inner case 34 in the orientation of FIG. 6B because each of holes 92, 96, and 100 of washer 46 does not match up with one of case holes 52. FIG. 6C is an elevation view of washer 46 rotated to clockwise approximately 120 degrees from the correct orientation of FIG. 6A. Similar to the orientation of FIG. 6B, washer 46 cannot be installed on inner case 34 in the orientation of FIG. 6C because each of holes 92, 96, and 100 of washer 46 does not match up with one of case holes 52.

Figure 7A:
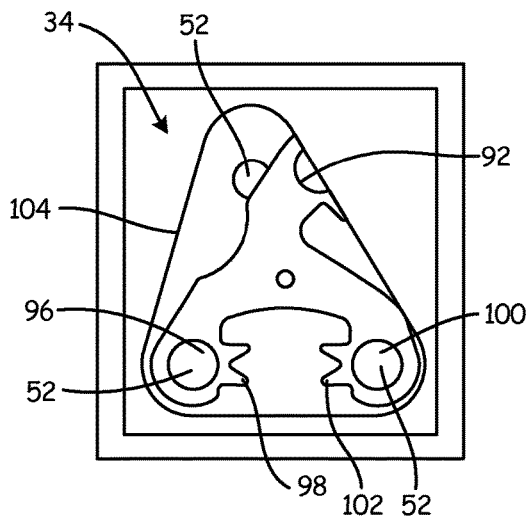
FIG. 7A is an elevation view of the washer from FIG. 5 orientated in another incorrect position for installation.
Figure 7B:
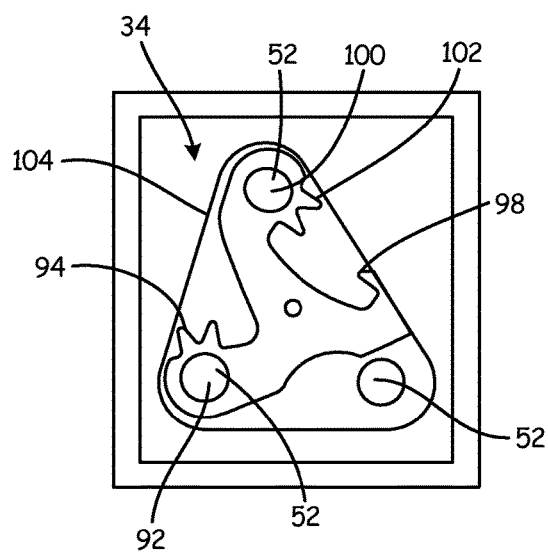
FIG. 7B is an elevation view of the washer from FIG. 5 orientated in another incorrect position for installation.
Figure 7C:
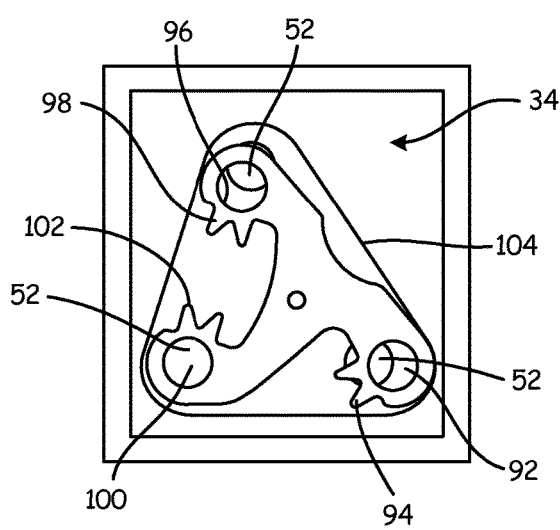
FIG. 7C is an elevation view of the washer from FIG. 5 orientated in another incorrect position for installation.

FIG. 7A is an elevation view of washer 46 flipped over from the correct orientation of FIG. 6A. FIG. 7B is an elevation view of washer 46 flipped over and rotated counter-clockwise approximately 120 degrees from the correct orientation of FIG. 6A. FIG. 7C is an elevation view of washer 46 flipped over and rotated clockwise approximately 120 degrees from the correct orientation of FIG. 6A. As shown in all of FIGS. 7A-7C, washer 46 cannot be installed on inner case 34 in the orientations of FIGS. 7A-7C because each of holes 92, 96, and 100 of washer 46 does not match up with one of case holes 52 in each of the orientations of FIGS. 7A-7C. Furthermore, the orientations of FIGS. 7A-7C are incorrect because first lobe 80, second lobe 82, and third lobe 84 of washer 46 are not flush against inner surface 48 of inner case 34 in the orientations of FIGS. 7A-7C due to the pre-bent in tabs 94, 98, and 102 lifting washer 46 off of inner surface 48 of inner case 34 in the orientations of FIGS. 7A-7C. By only allowing a single correct orientation for installing washer 46, scalene triangular outline $T_O$ of washer 46 functions as a failsafe to ensure that washer 46 is correctly installed on inner case 34. Incorrect installation of washer 46 on inner case 34 can result in improper preloading of strut 36 on inner case 34, which can lead to a shortened service life of mid turbine frame 20.

In view of the foregoing description, it will be recognized that the present disclosure provides numerous advantages and benefits. For example, washer 46 provides anti-rotation of bolts 72 without requiring the addition of any slots or grooves in inner surface 48 of inner case 34 of mid turbine frame 20. Adding grooves and slots to inner case 34, such as in the case of prior art mid turbine frame assemblies, can cause stress risers to form in inner case 34. Because inner case 34 does not include any slots or grooves to accommodate the anti-rotation functions of washer 46, inner case 34 and mid turbine frame 20 can have a longer service life than prior art mid turbine frame assemblies. Furthermore, washer 46 can include scalene triangular outline $T_O$ which only allows for a single installation orientation of washer 46. Because there is only a single orientation for properly installing washer 46, washer 46 includes a failsafe against improper installation.

The following are non-exclusive descriptions of possible embodiments of the present invention.

In one embodiment, a washer includes a hub and a first lobe connected to the hub. The first lobe includes a first hole. A second lobe is also connected to the hub and includes a second hole. A third lobe is also connected to the hub and includes a third hole. The first lobe extends from the hub at least partially in a first direction opposite the second lobe and the third lobe.

The washer of the preceding paragraph can optionally include, additionally and/or alternatively, any one or more of the following features, configurations and/or additional components:

the second lobe and the third lobe are spaced from one another in a second direction that is perpendicular to the first direction;

the hub includes a cooling air hole;

the first hole is nonaligned with the cooling air hole in the first direction;

the second hole is nonaligned with both the cooling air hole and the first hole in the first direction;

the second hole is nonaligned with the third hole in the second direction;

the first lobe includes at least two tabs extending from the first lobe and generally toward the second lobe, wherein the at least two tabs of the first lobe are configured to be bent in a third direction perpendicular to the first direction and the second direction;

the second lobe includes at least two tabs extending from the second lobe and toward the third lobe, wherein the at least two tabs of the second lobe are configured to be bent in a third direction perpendicular to the first direction and the second direction; and/or the third lobe includes at least two tabs extending from the third lobe and toward the second lobe, wherein the at least two tabs of the third lobe are configured to be bent in a third direction perpendicular to the first direction and the second direction.

In another embodiment, a mid turbine frame includes an outer case, an inner case disposed radially within the outer case, and a strut extending radially between the outer case and the inner case. The strut includes a first end connected to the outer case, a second end forming a foot disposed against an outer surface of the inner case, and a cooling air passage formed inside the strut and that extends from the first end of the strut to the second end of the strut. The mid turbine frame also includes a washer disposed on an inner surface of the inner case opposite the foot of the strut. The washer includes a hub, a first lobe connected to the hub and having a first hole, a second lobe connected to the hub and having a second hole; and a third lobe connected to the hub and having a third hole. The first lobe extends from the hub at least partially in a first direction opposite the second lobe and the third lobe.

The mid turbine frame of the preceding paragraph can optionally include, additionally and/or alternatively, any one or more of the following features, configurations and/or additional components:

the foot of the strut includes a first foot hole concentric with the first hole of the washer, a second foot hole concentric with the second hole of the washer, and a third foot hole concentric with the third hole of the washer;

the inner case includes a first case hole concentric with both the first hole of the washer and the first foot hole of the foot of the strut, a second case hole concentric with both the second hole of the washer and the second foot hole of the foot of the strut, and a third case hole concentric with both the third hole of the washer and the third foot hole of the foot of the strut;

a first fastener disposed in the first case hole, the first hole of the washer, and the first foot hole of the foot of the strut; a second fastener disposed in the second case hole, the second hole of the washer, and the second foot hole of the foot of the strut; and a third fastener disposed in the third case hole, the third hole of the washer, and the third foot hole of the foot of the strut;

the inner case includes a cooling air inlet that extends from the outer surface of the inner case to the inner surface of the inner case, wherein the cooling air inlet is in fluidic communication with the cooling air passage of the strut;

the hub of the washer includes a cooling air hole that is concentric with the cooling air inlet of the inner case, wherein the cooling air hole is larger in diameter than the cooling air inlet;

the first hole of the washer is nonaligned with the cooling air hole in the first direction, the second hole of the washer is nonaligned with both the cooling air hole and the first hole of the washer in the first direction, and the second hole of the washer is nonaligned with the third hole of the washer in a second direction that is perpendicular with the first direction; and/or the first lobe, the second lobe, and the third lobe of the washer each include at least two tabs configured to be bent away from the inner surface of the inner case and against a head of the first fastener, a head of the second fastener, and a head of the third fastener respectively.

In another embodiment, a generally triangular washer includes a first corner having a first hole, a second corner having a second hole, and a third corner having a third hole. The washer also includes a generally triangular cutout formed between the first corner and the second corner, and a generally rectangular cutout formed between the second corner and the third corner. A first tab extends from the first corner of the washer into the generally triangular cutout. A second tab extends from the second corner of the washer into the generally rectangular cutout. A third tab extends from the third corner of the washer into the generally rectangular cutout.

The washer of the preceding paragraph can optionally include, additionally and/or alternatively, any one or more of the following features, configurations and/or additional components:

the second hole is spaced closer to the first hole than the third hole is spaced from the first hole; and/or a cooling air hole is formed in the washer and disposed between the first corner and the generally rectangular cutout.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 2-4 show fasteners 44 as bolts 72 and nuts 76, fasteners 44 can include any fastener capable of connecting foot 62 of strut 36 and washer 46 to inner case 34. In addition, many modifications may be made to adapt a particular situation or material to the teachings of the invention without departing from the essential scope thereof. For example, while washer 46 has been described with reference to use in mid turbine frame 20, washer 46 can also be used in intermediate frames for compressor sections of a gas turbine engine. Therefore, it is intended that the invention not be limited to the particular embodiment(s) disclosed, but that the invention will include all embodiments falling within the scope of the appended claims.

The invention claimed is:

1. A washer comprising:
 a hub;
 a first lobe connected to the hub and comprising a first hole;
 a second lobe connected to the hub and comprising a second hole; and
 a third lobe connected to the hub and comprising a third hole,
 wherein the first lobe extends from the hub at least partially in a first direction opposite the second lobe and the third lobe,
 wherein the second lobe and the third lobe are spaced from one another in a second direction that is perpendicular to the first direction,
 wherein the first lobe comprises at least two tabs extending from the first lobe and toward the second lobe, wherein the at least two tabs of the first lobe are configured to be bent in a third direction perpendicular to the first direction and the second direction,
 wherein the second lobe comprises at least two tabs extending from the second lobe and toward the third lobe, wherein the at least two tabs of the second lobe are configured to be bent in a third direction perpendicular to the first direction and the second direction, and
 wherein the third lobe comprises at least two tabs extending from the third lobe and toward the second lobe, wherein the at least two tabs of the third lobe are configured to be bent in a third direction perpendicular to the first direction and the second direction.

2. The washer of claim 1, wherein the hub comprises:
 a cooling air hole.

3. The washer of claim 2, wherein the first hole is nonaligned with the cooling air hole in the first direction.

4. The washer of claim 3, wherein the second hole is nonaligned with both the cooling air hole and the first hole in the first direction.

5. The washer of claim 4, wherein the second hole is nonaligned with the third hole in the second direction.

6. A mid turbine frame comprising:
 an outer case;
 an inner case disposed radially within the outer case;
 a strut extending radially between the outer case and the inner case, wherein the strut comprises:
 a first end connected to the outer case;
 a second end forming a foot disposed against an outer surface of the inner case; and
 a cooling air passage formed inside the strut and that extends from the first end of the strut to the second end of the strut; and a washer disposed on an inner surface of the inner case opposite the foot of the strut, wherein the washer comprises:
a hub;
a first lobe connected to the hub and comprising a first hole;
a second lobe connected to the hub and comprising a second hole; and
a third lobe connected to the hub and comprising a third hole,
wherein the first lobe extends from the hub at least partially in a first direction opposite the second lobe and the third lobe;
at least two tabs extending from the first lobe and toward the second lobe;
at least two tabs extending from the second lobe and toward the third lobe; and
at least two tabs extending from the third lobe and toward the second lobe.

7. The mid turbine frame of claim 6, wherein the foot of the strut comprises:
a first foot hole concentric with the first hole of the washer;
a second foot hole concentric with the second hole of the washer; and
a third foot hole concentric with the third hole of the washer.

8. The mid turbine frame of claim 7, wherein the inner case comprises:
a first case hole concentric with both the first hole of the washer and the first foot hole of the foot of the strut;
a second case hole concentric with both the second hole of the washer and the second foot hole of the foot of the strut; and
a third case hole concentric with both the third hole of the washer and the third foot hole of the foot of the strut.

9. The mid turbine frame of claim 8 further comprising:
a first fastener disposed in the first case hole, the first hole of the washer, and the first foot hole of the foot of the strut;
a second fastener disposed in the second case hole, the second hole of the washer, and the second foot hole of the foot of the strut; and
a third fastener disposed in the third case hole, the third hole of the washer, and the third foot hole of the foot of the strut.

10. The mid turbine frame of claim 9, wherein the inner case comprises:
a cooling air inlet that extends from the outer surface of the inner case to the inner surface of the inner case,
wherein the cooling air inlet is in fluidic communication with the cooling air passage of the strut.

11. The mid turbine frame of claim 10, wherein the hub of the washer comprises:
a cooling air hole that is concentric with the cooling air inlet of the inner case,
wherein the cooling air hole is larger in diameter than the cooling air inlet.

12. The mid turbine frame of claim 11, wherein the first hole of the washer is nonaligned with the cooling air hole in the first direction, the second hole of the washer is nonaligned with both the cooling air hole and the first hole of the washer in the first direction, and the second hole of the washer is nonaligned with the third hole of the washer in a second direction that is perpendicular with the first direction.

13. The mid turbine frame of claim 12, wherein the at least two tabs on the first lobe, the second lobe, and the third lobe are configured to be bent away from the inner surface of the inner case and against a head of the first fastener, a head of the second fastener, and a head of the third fastener respectively.

14. A triangular washer comprising:
a first corner comprising a first hole;
a second corner comprising a second hole;
a third corner comprising a third hole;
a triangular cutout formed between the first corner and the second corner;
a rectangular cutout formed between the second corner and the third corner;
a first tab extending from the first corner into the triangular cutout;
a second tab extending from the second corner into the rectangular cutout; and
a third tab extending from the third corner into the rectangular cutout.

15. The washer of claim 14, wherein the second hole is spaced closer to the first hole than the third hole is spaced from the first hole.

16. The washer of claim 15 further comprising:
a cooling air hole formed in the washer and disposed between the first corner and the rectangular cutout.

* * * * *